United States Patent
Jurcevic et al.

(10) Patent No.: US 12,020,122 B1
(45) Date of Patent: Jun. 25, 2024

(54) MITIGATING ERRORS IN MEASUREMENTS FROM A QUANTUM SYSTEM BY DEFINING REGIONS OF TRUST

(71) Applicant: International Business Machines Corporation, Armonk, NY (US)

(72) Inventors: Petar Jurcevic, Yorktown Heights, NY (US); Helena Zhang, White Plains, NY (US); Lev Samuel Bishop, Dobbs Ferry, NY (US)

(73) Assignee: International Business Machines Corporation, Armonk, NY (US)

( * ) Notice: Subject to any disclaimer, the term of this patent is extended or adjusted under 35 U.S.C. 154(b) by 27 days.

(21) Appl. No.: 18/082,453

(22) Filed: Dec. 15, 2022

(51) Int. Cl.
*G06N 10/70* (2022.01)
*G06N 10/60* (2022.01)

(52) U.S. Cl.
CPC ............. *G06N 10/70* (2022.01); *G06N 10/60* (2022.01)

(58) Field of Classification Search
CPC ............................... G06N 10/70; G06N 10/60
See application file for complete search history.

(56) References Cited

U.S. PATENT DOCUMENTS

| | | | |
|---|---|---|---|
| 2019/0123097 A1* | 4/2019 | Cole | H10N 60/01 |
| 2020/0342347 A1* | 10/2020 | Gambetta | G06N 20/00 |
| 2021/0049492 A1 | 2/2021 | Kim et al. | |
| 2021/0049498 A1* | 2/2021 | Liu | G06N 20/00 |
| 2022/0147857 A1* | 5/2022 | Wang | G06N 10/70 |
| 2022/0269963 A1 | 8/2022 | Delfosse et al. | |

(Continued)

FOREIGN PATENT DOCUMENTS

| | | |
|---|---|---|
| CN | 102609904 A | 7/2012 |
| CN | 109606730 A | 4/2019 |
| CN | 111835433 A | 10/2020 |

(Continued)

OTHER PUBLICATIONS

Bravyi et al., "Mitigatig Measurement Errors in Multiqubit Experiments," Physical Review A, vol. 103, 2021, pp. 1-12.

(Continued)

*Primary Examiner* — Matthew M Kim
*Assistant Examiner* — Matthew N Putaraksa
(74) *Attorney, Agent, or Firm* — Shackelford, McKinley & Norton, LLP; Robert A. Voigt, Jr.

(57) ABSTRACT

A method, system and computer program product for mitigating errors in measurements from a quantum system. A discriminator is trained to classify the measurement results of the quantum states of qubits as corresponding to a first quantum state (e.g., quantum state of 0) or a second quantum state (e.g., quantum state of 1). A first region of trust (corresponding to trusted measurements of a first quantum state) with a first discriminator boundary and a second region of trust (corresponding to trusted measurements of a second quantum state) with a second discriminator boundary are defined using the trained discriminator. If a shot-to-shot measurement result of a qubit state falls outside such regions of trust, the measurement result is rejected. In this manner, measurement errors from a quantum system are effectively mitigated, including measurement errors involving shot-to-shot measurement results of the quantum states read from the execution of the quantum circuits.

20 Claims, 6 Drawing Sheets

(56) References Cited

U.S. PATENT DOCUMENTS

2023/0126764 A1* 4/2023 Ibrahim ................ G06N 20/10
           705/44
2024/0020569 A1* 1/2024 Inoue ..................... G06N 10/20

FOREIGN PATENT DOCUMENTS

| CN | 112906898 | A  | 6/2021 |
| CN | 114997407 | A  | 9/2022 |
| EP | 4012943   | A1 | 6/2022 |

OTHER PUBLICATIONS

Lienhard et al., "Deep-Neural-Network Discrimination of Multiplexed Superconducting-Qubit States," Physical Review Applied, vol. 17, 2022, pp. 1-18.

* cited by examiner

MITIGATING ERRORS IN MEASUREMENTS FROM A QUANTUM SYSTEM BY DEFINING REGIONS OF TRUST

TECHNICAL FIELD

The present disclosure relates generally to measurement error mitigation in quantum computing, and more particularly to mitigating errors in measurements from a quantum system by defining regions of trust, such as in an IQ (in-phase and quadrature) plane.

BACKGROUND

Quantum computing is a type of computation that harnesses the collective properties of quantum states, such as superposition, interference, and entanglement, to perform calculations. The devices that perform quantum computations are known as quantum computers. Though current quantum computers are too small to outperform usual (classical) computers for practical applications, they are believed to be capable of solving certain computational problems, such as integer factorization, substantially faster than classical computers.

There are several types of quantum computers (also known as quantum computing systems), including the quantum circuit model, quantum Turing machine, adiabatic quantum computer, one-way quantum computer, and various quantum cellular automata. The most widely used model is the quantum circuit, based on the quantum bit, or "qubit," which is somewhat analogous to the bit in classical computation. A qubit can be in a 1 or 0 quantum state, or in a superposition of the 1 and 0 states. When the state of the qubit is measured from the execution of the quantum circuit, however, it is always 0 or 1 where the probability of either outcome depends on the qubit's quantum state immediately prior to measurement. That is, the qubit state collapses into either the quantum state of 0 (represented as "|0>") or the quantum state of 1 (represented as "|1>").

Unfortunately, quantum devices, such as quantum circuits, are susceptible to errors. In particular, the qubit measurement is among the most error-prone operations on quantum devices, with error rates ranging from 8% to 30% for current hardware. These errors arise from bit flips, i.e., from erroneously recording an outcome as 0 given it was actually 1, and vice-versa. As a result, the classification of the measurement of the qubit as being in a particular quantum state is susceptible to errors.

If such quantum state measurements are well calibrated, such qubit states may form two clouds (one for the quantum state of 0 and one for the quantum state of 1) such as in an IQ (in-phase and quadrature) plane.

Unfortunately, such clouds may not be well separated due to the errors in the quantum state measurements discussed above and have a substantial overlap thereby increasing the chance of false classification (i.e., falsely classifying the measurement as being in the qubit state of 0 as opposed to the qubit state of 1 or vice-versa).

Furthermore, even if the clouds are well separated, a" T1" event (decay of an excited state) during the measurement process may cause the measurement to be in a position in the IQ plane between the two clouds making it difficult to classify the qubit state.

Various error mitigation strategies have been developed in an attempt to mitigate such measurement errors. Unfortunately, such error mitigation strategies require a large number of shots (a shot corresponds to one complete execution of a quantum circuit) to build a quasi-probability distribution (probabilities of the occurrence of the measured quantum state being in the quantum state of 0 or 1) utilized by such error mitigation strategies.

Furthermore, such mitigation strategies are not able to mitigate errors in quantum state measurements on a shot-by-shot basis, which would improve the speed at which measurement errors in quantum state measurements are mitigated.

As a result, there is not currently a means for effectively mitigating errors in measurements from a quantum system, such as measurements of the quantum states read from the execution of a quantum circuit, including on a shot-by-shot basis, without requiring a large number of shots.

SUMMARY

In one embodiment of the present disclosure, a method for mitigating errors in measurements from a quantum system comprises training a discriminator to classify measurements of quantum states of qubits as corresponding to a first quantum state or a second quantum state. The method further comprises defining a first region of trust based on a first discriminator boundary and a second region of trust based on a second discriminator boundary corresponding to trusted measurements of the first quantum state and the second quantum state, respectively, using the trained discriminator. The method additionally comprises receiving a measurement result of a qubit state. Furthermore, the method comprises rejecting the measurement result in response to not being located within the first region of trust or the second region of trust.

Additionally, in one embodiment of the present disclosure, the measurement result of the qubit state corresponds to a set of two signals in quadrature.

Furthermore, in one embodiment of the present disclosure, the first and second regions of trust are defined in an IQ plane.

Additionally, in one embodiment of the present disclosure, the method further comprises selecting a first axis and a second axis of an ellipse to align with an in-phase and a quadrature axis, respectively, to create the first discriminator boundary and the second discriminator boundary.

Furthermore, in one embodiment of the present disclosure, the method additionally comprises scaling a length of the first and second axes by multiplying a scaling factor with a standard deviation.

Additionally, in one embodiment of the present disclosure, the measurement result of the qubit state corresponds to a shot-to-shot measurement of the qubit state.

Furthermore, in one embodiment of the present disclosure, the measurement result of the qubit state corresponds to a measurement during an execution of a quantum circuit.

Additionally, in one embodiment of the present disclosure, the discriminator is trained to classify multi-dimensional quantum data on a shot-by-shot basis.

Other forms of the embodiments of the method described above are in a system and in a computer program product.

Accordingly, embodiments of the present disclosure effectively mitigate measurement errors from a quantum system, including measurement errors involving shot-to-shot measurement results of the quantum states read from the execution of the quantum circuits, without requiring a large number of shots.

The foregoing has outlined rather generally the features and technical advantages of one or more embodiments of the present disclosure in order that the detailed description of the present disclosure that follows may be better understood. Additional features and advantages of the present disclosure will be described hereinafter which may form the subject of the claims of the present disclosure.

BRIEF DESCRIPTION OF THE DRAWINGS

A better understanding of the present disclosure can be obtained when the following detailed description is considered in conjunction with the following drawings, in which.

DETAILED DESCRIPTION

Figure 1:
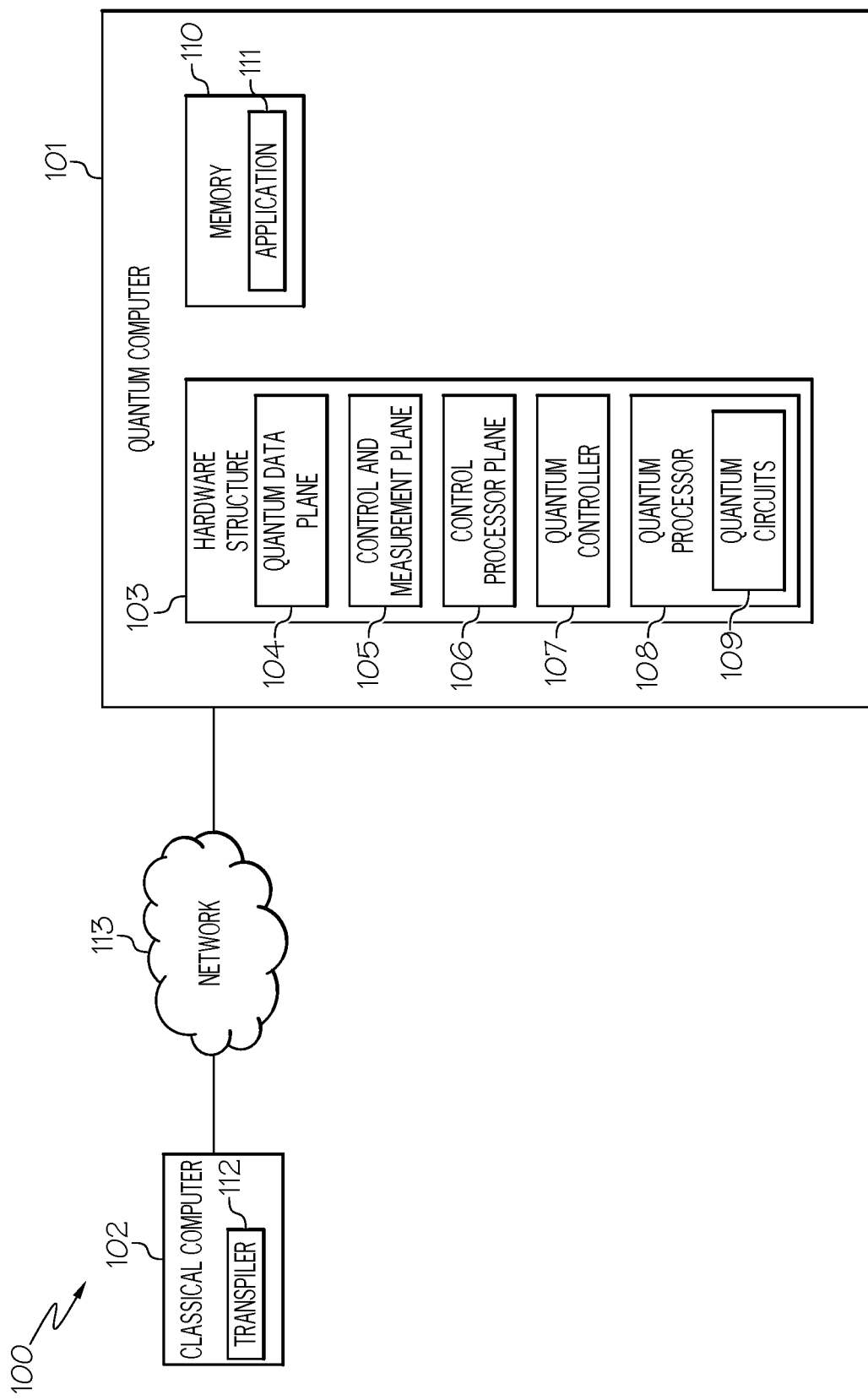
FIG. 1 illustrates a communication system for practicing the principles of the present disclosure in accordance with an embodiment of the present disclosure.

As stated in the Background section, there are several types of quantum computers (also known as quantum computing systems), including the quantum circuit model, quantum Turing machine, adiabatic quantum computer, one-way quantum computer, and various quantum cellular automata. The most widely used model is the quantum circuit, based on the quantum bit, or "qubit," which is somewhat analogous to the bit in classical computation. A qubit can be in a 1 or 0 quantum state, or in a superposition of the 1 and 0 states. When the state of the qubit is measured from the execution of the quantum circuit, however, it is always 0 or 1 where the probability of either outcome depends on the qubit's quantum state immediately prior to measurement. That is, the qubit state collapses into either the quantum state of 0 (represented as "|0>") or the quantum state of 1 (represented as "|1>").

Unfortunately, quantum devices, such as quantum circuits, are susceptible to errors. In particular, the qubit measurement is among the most error-prone operations on quantum devices, with error rates ranging from 8% to 30% for current hardware. These errors arise from bit flips, i.e., from erroneously recording an outcome as 0 given it was actually 1, and vice-versa. As a result, the classification of the measurement of the qubit as being in a particular quantum state is susceptible to errors.

If such quantum state measurements are well calibrated, such qubit states may form two clouds (one for the quantum state of 0 and one for the quantum state of 1) such as in an IQ (in-phase and quadrature) plane.

Unfortunately, such clouds may not be well separated due to the errors in the quantum state measurements discussed above and have a substantial overlap thereby increasing the chance of false classification (i.e., falsely classifying the measurement as being in the qubit state of 0 as opposed to the qubit state of 1 or vice-versa).

Furthermore, even if the clouds are well separated, a" T1" event (decay of an excited state) during the measurement process may cause the measurement to be in a position in the IQ plane between the two clouds making it difficult to classify the qubit state.

Various error mitigation strategies have been developed in an attempt to mitigate such measurement errors. Unfortunately, such error mitigation strategies require a large number of shots (a shot corresponds to one complete execution of a quantum circuit) to build a quasi-probability distribution (probabilities of the occurrence of the measured quantum state being in the quantum state of 0 or 1) utilized by such error mitigation strategies.

Furthermore, such mitigation strategies are not able to mitigate errors in quantum state measurements on a shot-by-shot basis, which would improve the speed at which measurement errors in quantum state measurements are mitigated.

As a result, there is not currently a means for effectively mitigating errors in measurements from a quantum system, such as measurements of the quantum states read from the execution of a quantum circuit, including on a shot-by-shot basis, without requiring a large number of shots.

The embodiments of the present disclosure provide the means for effectively mitigating errors in measurements from a quantum system, such as measurements of the quantum states read from the execution of a quantum circuit, by defining regions of trust corresponding to trusted measurements of a first quantum state (e.g., quantum state of 0) and a second quantum state (e.g., quantum state of 1) of a qubit by creating a discriminator boundary for the regions of trust. After defining such regions of trust, when a measurement result of a qubit state is received, if such a measurement result is not within one of these regions of trust, the measurement result is rejected. Otherwise, the measurement result is accepted. In this manner, errors in the measurements from a quantum system are mitigated. These and other features will be discussed in further detail below.

While the following discusses the present disclosure in connection with classifying between the 0 and 1 quantum states, the principles of the present disclosures may be utilized for classifying any number of states. For example, the principles of the present disclosure may be utilized in applications for discriminating complex quantum systems with a significant population that is not in the 0 and 1 quantum states. A person of ordinary skill in the art would be capable of applying the principles of the present disclosure to such implementations. Furthermore, embodiments applying the principles of the present disclosure to such implementations would fall within the scope of the present disclosure.

In some embodiments of the present disclosure, the present disclosure comprises a method, system and computer program product for mitigating errors in measurements from a quantum system. In one embodiment of the present disclosure, a discriminator is trained to classify the measurement results of the quantum states of qubits as corresponding to a first quantum state (e.g., quantum state of 0) or a second quantum state (e.g., quantum state of 1). A first region of trust (corresponding to trusted measurements of a first quantum state) with a first discriminator boundary and a second region of trust (corresponding to trusted measurements of a second quantum state) with a second discriminator boundary are defined using the trained discriminator. The first and second discriminator boundaries for the first and second regions of trust are used to classify measurement results as being within and outside such regions of trust. By utilizing such a scheme, measurement results of the qubit states that correspond to a shot-to-shot measurement of the qubit state may be received and analyzed. If the shot-to-shot measurement result of a qubit result falls within such a region of trust, the measurement result is accepted. If, however, the shot-to-shot measurement result of a qubit state falls outside such regions of trust, the measurement result is rejected. In this manner, measurement errors from a quantum system are effectively mitigated, including measurement errors involving shot-to-shot measurement results of the quantum states read from the execution of the quantum circuits, without requiring a large number of shots.

In the following description, numerous specific details are set forth to provide a thorough understanding of the present disclosure. However, it will be apparent to those skilled in the art that the present disclosure may be practiced without such specific details. In other instances, well-known circuits have been shown in block diagram form in order not to obscure the present disclosure in unnecessary detail. For the most part, details considering timing considerations and the like have been omitted inasmuch as such details are not necessary to obtain a complete understanding of the present disclosure and are within the skills of persons of ordinary skill the relevant art.

Referring now to the Figures in detail, FIG. 1 illustrates an embodiment of the present disclosure of a communication system 100 for practicing the principles of the present disclosure. Communication system 100 includes a quantum computer 101 configured to perform quantum computations, such as the types of computations that harness the collective properties of quantum states, such as superposition, interference and entanglement, as well as a classical computer 102 in which information is stored in bits that are represented logically by either a 0 (off) or a 1 (on). Examples of classical computer 102 include, but not limited to, a portable computing unit, a Personal Digital Assistant (PDA), a laptop computer, a mobile device, a tablet personal computer, a smartphone, a mobile phone, a navigation device, a gaming unit, a desktop computer system, a workstation, and the like configured with the capability of connecting to network 113 (discussed below).

In one embodiment, classical computer 102 is used to setup the state of quantum bits in quantum computer 101 and then quantum computer 101 starts the quantum process. Furthermore, in one embodiment, classical computer 102 is configured to effectively mitigate measurement errors from a quantum system, such as mitigating measurement errors of the measurement results (including shot-to-shot measurement results) of the quantum states read from the execution of quantum circuits of quantum computer 101, without requiring a large number of shots as discussed further below.

In one embodiment, a hardware structure 103 of quantum computer 101 includes a quantum data plane 104, a control and measurement plane 105, a control processor plane 106, a quantum controller 107 and a quantum processor 108.

Quantum data plane 104 includes the physical qubits or quantum bits (basic unit of quantum information in which a qubit is a two-state (or two-level) quantum-mechanical system) and the structures needed to hold them in place. In one embodiment, quantum data plane 104 contains any support circuitry needed to measure the qubits' state and perform gate operations on the physical qubits for a gate-based system or control the Hamiltonian for an analog computer. In one embodiment, control signals routed to the selected qubit(s) set a state of the Hamiltonian. For gate-based systems, since some qubit operations require two qubits, quantum data plane 104 provides a programmable "wiring" network that enables two or more qubits to interact.

Control and measurement plane 105 converts the digital signals of quantum controller 107, which indicates what quantum operations are to be performed, to the analog control signals needed to perform the operations on the qubits in quantum data plane 104. In one embodiment, control and measurement plane 105 converts the analog output of the measurements of qubits in quantum data plane 104 to classical binary data that quantum controller 107 can handle.

Control processor plane 106 identifies and triggers the sequence of quantum gate operations and measurements (which are subsequently carried out by control and measurement plane 105 on quantum data plane 104). These sequences execute the program, provided by quantum processor 108, for implementing a quantum algorithm.

In one embodiment, control processor plane 106 runs the quantum error correction algorithm (if quantum computer 101 is error corrected).

In one embodiment, quantum processor 108 uses qubits to perform computational tasks. In the particular realms where quantum mechanics operate, particles of matter can exist in multiple states, such as an "on" state, an "off" state and both "on" and "off" states simultaneously. Quantum processor 108 harnesses these quantum states of matter to output signals that are usable in data computing.

In one embodiment, quantum processor 108 performs algorithms which conventional processors are incapable of performing efficiently.

In one embodiment, quantum processor 108 includes one or more quantum circuits 109. Quantum circuits 109 may collectively or individually be referred to as quantum circuits 109 or quantum circuit 109, respectively. A "quantum circuit 109," as used herein, refers to a model for quantum computation in which a computation is a sequence of quantum logic gates, measurements, initializations of qubits to known values and possibly other actions. A "quantum logic gate," as used herein, is a reversible unitary transformation on at least one qubit. Quantum logic gates, in contrast to classical logic gate, are all reversible. Examples of quantum logic gates include RX (performs $e^{j\theta X}$, which corresponds to a rotation of the qubit state around the X-axis by the given angle theta $\theta$ on the Bloch sphere), RY (performs $e^{j\theta Y}$, which corresponds to a rotation of the qubit state around the Y-axis by the given angle theta $\theta$ on the Bloch sphere), RXX (performs the operation $e^{(-i\theta/2 X \oplus X)}$ on the input qubit), RZZ (takes in one input, an angle theta $\theta$ expressed in radians, and it acts on two qubits), etc. In one embodiment, quantum circuits 109 are written such that the horizontal axis is time, starting at the left hand side and ending at the right hand side.

Furthermore, in one embodiment, quantum circuit 109 corresponds to a command structure provided to control processor plane 106 on how to operate control and measurement plane 105 to run the algorithm on quantum data plane 104/quantum processor 108.

Furthermore, quantum computer 101 include memory 110, which may correspond to quantum memory. In one embodiment, memory 110 is a set of quantum bits that store quantum states for later retrieval. The state stored in quantum memory 110 can retain quantum superposition.

In one embodiment, memory 110 stores an application 111 that may be configured to implement one or more of the methods described herein in accordance with one or more embodiments. For example, application 111 may implement a program for effectively mitigating measurement errors from a quantum system, such as mitigating measurement errors of the measurement results (including shot-to-shot measurement results) of the quantum states read from the execution of quantum circuits 109 of quantum computer 101, without requiring a large number of shots as discussed further below in connection with FIGS. 2-6. Examples of memory 110 include light quantum memory, solid quantum memory, gradient echo memory, electromagnetically induced transparency, etc.

Furthermore, in one embodiment, classical computer 102 includes a "transpiler 112," which as used herein, is configured to rewrite an abstract quantum circuit 109 into a functionally equivalent one that matches the constraints and characteristics of a specific target quantum device. In one embodiment, transpiler 112 (e.g., qiskit.transpiler, where Qiskit® is an open-source software development kit for working with quantum computers at the level of circuits, pulses and algorithms) converts the trained machine learning model upon execution on quantum hardware 103 to its elementary instructions and maps it to physical qubits.

In one embodiment, quantum machine learning models are based on variational quantum circuits 109. Such models consist of data encoding, processing parameterized with trainable parameters and measurement/post-processing.

In one embodiment, the number of qubits (basic unit of quantum information in which a qubit is a two-state (or two-level) quantum-mechanical system) is determined by the number of features in the data. This processing stage may include multiple layers of parameterized gates. As a result, in one embodiment, the number of trainable parameters is (number of features)*(number of layers).

Furthermore, as shown in FIG. 1, classical computer 102, which is used to setup the state of quantum bits in quantum computer 101, may be connected to quantum computer 101 via a network 113.

Network 113 may be, for example, a quantum network, a local area network, a wide area network, a wireless wide area network, a circuit-switched telephone network, a Global System for Mobile Communications (GSM) network, a Wireless Application Protocol (WAP) network, a WiFi network, an IEEE 802.11 standards network, a cellular network and various combinations thereof, etc. Other networks, whose descriptions are omitted here for brevity, may also be used in conjunction with system 100 of FIG. 1 without departing from the scope of the present disclosure.

Furthermore, classical computer 102 is configured to effectively mitigate measurement errors from a quantum system, such as mitigating measurement errors of the measurement results (including shot-to-shot measurement results) of the quantum states read from the execution of quantum circuits 109 of quantum computer 101, without requiring a large number of shots as discussed further below in connection with FIGS. 2-6. A description of the software components of classical computer 102 is provided below in connection with FIG. 2 and a description of the hardware configuration of classical computer 102 is provided further below in connection with FIG. 4.

System 100 is not to be limited in scope to any one particular network architecture. System 100 may include any number of quantum computers 101, classical computers 102 and networks 113.

A discussion regarding the software components used by classical computer 102 for effectively mitigating measurement errors from a quantum system is provided below in connection with FIG. 2.

Figure 2:
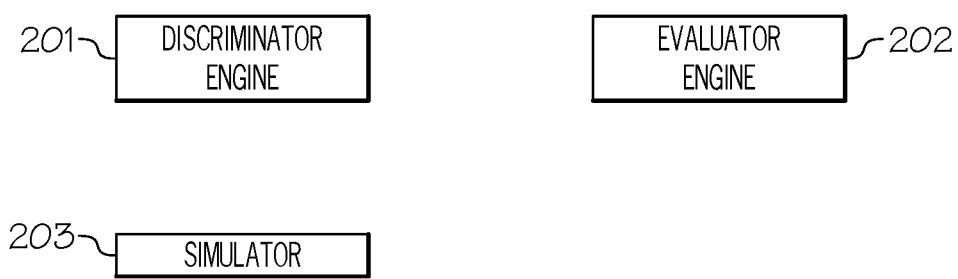
FIG. 2 is a diagram of the software components of the classical system for effectively mitigating measurement errors from a quantum system without requiring a large number of shots in accordance with an embodiment of the present disclosure.

FIG. 2 is a diagram of the software components of classical system 102 (FIG. 1) for effectively mitigating measurement errors from a quantum system, such as mitigating measurement errors of the measurement results (including shot-to-shot measurement results) of the quantum states read from the execution of quantum circuits 109 of quantum computer 101, without requiring a large number of shots in accordance with an embodiment of the present disclosure.

Referring to FIG. 2, in conjunction with FIG. 1, classical computer 102 includes a discriminator engine 201 configured to train a discriminator to classify measurements of the quantum states of qubits as corresponding to a first quantum state (e.g., quantum state of 0) or a second quantum state (e.g., quantum state of 1).

In one embodiment, discriminator engine 201 trains a discriminator to classify the measurements (measurement results of the qubit states) as corresponding to a first quantum state (e.g., quantum state of 0) or a second quantum state (e.g., quantum state of 1) based on sample data consisting of measurement results of known quantum states (e.g., quantum state of 0, quantum state of 1). Such sample data is referred to herein as the "training data," which is used by a machine learning algorithm to make decisions as to the classification of the measurement result of the qubit state as corresponding to a particular quantum state. For example, a discriminator may be trained to classify measurement results from the execution of quantum circuit 109 as corresponding to a first quantum state (e.g., quantum state of 0) based on training data that includes measurement results of the known quantum state of 0. Similarly, the discriminator may be trained to classify measurement results from the execution of quantum circuit 109 as corresponding to a second quantum state (e.g., quantum state of 1) based on training data that includes measurement results of the known quantum state of 1. The algorithm iteratively makes predictions on the training data as to the predicted quantum state of the measurement results until the predictions achieve the desired accuracy as determined by an expert. Examples of such learning algorithms include nearest neighbor, Naïve Bayes, decision trees, linear regression, support vector machines and neural networks.

In one embodiment, the discriminator is trained/calibrated by measuring the result of the execution of a quantum circuit 109 of a known quantum state (e.g., quantum state of 0, quantum state of 1) and labeling such measurements as corresponding to measurements of a first quantum state (e.g., quantum state of 0) and measurements of a second quantum state (e.g., quantum state of 1). Such labeled measurements may then be used as "training data" to train the discriminator as discussed above.

In one embodiment, discriminator engine 201 of classical computer 102 trains a discriminator to classify multi-dimensional quantum data on a shot-by-shot basis.

In one embodiment, discriminator engine 201 uses the trained discriminator to distinguish between measurement results of qubit states that are read from the execution of quantum circuits 109 that fall within a region of trust or outside the regions of trust. In one embodiment, such regions of trust, such as a first region of trust and a second region of trust, where the first region of trust corresponds to trusted measurements of a first state of a qubit (e.g., quantum state of 0) and the second region of trust corresponds to trusted measurements of a second state of a qubit (e.g., quantum state of 1), are defined by the trained discriminator. For example, the first region of trust may be defined by the discriminator in terms of a discriminator boundary which determines whether measurement results of the quantum state of a qubit read from the execution of quantum circuit 109 falls within the first region of trust corresponding to trusted measurements of the first quantum state (e.g., quantum state of 0). The second region of trust may be defined by the discriminator in terms of a discriminator boundary which determines whether measurement results of the quantum state of a qubit read from the execution of quantum circuits 109 falls within the second region of trust corresponding to trusted measurements of the second quantum state (e.g., quantum state of 1). Hence, such regions of trust are defined by a discriminator boundary which determines whether measurement results of the quantum state of a qubit read from the execution of quantum circuits 109 falls within or outside such regions of trust. Those measurement results that fall within a region of trust are accepted; whereas, those measurements that fall outside the regions of trust (outside the discriminator boundary) are rejected.

As discussed above, those measurement results that fall within a region of trust are accepted; whereas, those measurement results that fall outside the regions of trust (outside the discriminator boundary) are rejected. An illustration of such regions of trust defined by a discriminator boundary is shown in FIG. 3.

Figure 3:
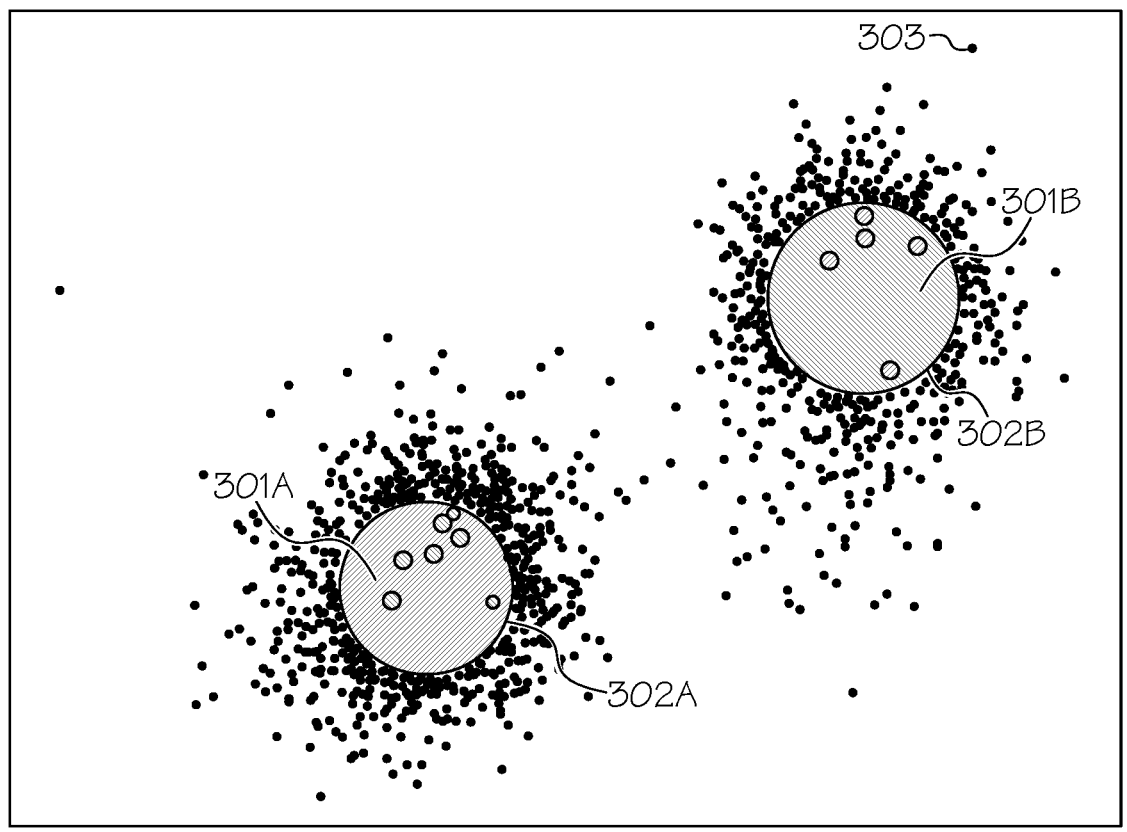
FIG. 3 illustrates two regions of trust defined by a discriminator boundary which determines whether the measurements of the quantum states of the qubits read from the execution of quantum circuits falls within or outside such regions of trust in accordance with an embodiment of the present disclosure.

Referring to FIG. 3, FIG. 3 illustrates two regions of trust defined by a discriminator boundary which determines whether the measurements of the quantum states of the qubits read from the execution of quantum circuits 109 falls within or outside such regions of trust in accordance with an embodiment of the present disclosure.

As shown in FIG. 3, regions of trust 301A, 301B are defined by a discriminator boundary 302A, 302B, respectively, which determines which measurement results (represented by dots 303) of the quantum states of the qubits read from the execution of quantum circuits 109 fall within or outside such regions of trust. In one embodiment, region of trust 301A represents those measurements (represented by dots 303) of a first quantum state (e.g., quantum state of 0) that are deemed to be trustworthy and region of trust 301B represents those measurements (represented by dots 303) of a second quantum state (e.g., quantum state of 1) that are deemed to be trustworthy. Measurements (represented by dots 303) outside such regions of trust 301A, 301B, as determined by discriminator boundary 302A, 302B, respectively, are deemed to not be trustworthy. Regions of trust 301A, 301B may collectively or individually be referred to as regions of trust 301 or region of trust 301, respectively. Discriminator boundaries 302A, 302B may collectively or individually be referred to as discriminator boundaries 302 or discriminator boundary 302, respectively.

In one embodiment, discriminator boundary 302 of such regions of trust 301, which determines which measurement results are located within or outside region of trust 301 (i.e., determines which measurement results are trustworthy or not trustworthy), is determined based on the trained discriminator discussed above.

In one embodiment, discriminator boundary 302 corresponds to an elliptical discriminator boundary. In one embodiment, regions of trust 301 are defined in an IQ (in-phase and quadrature) plane. In such an embodiment, the location of discriminatory boundary 302 is established by selecting the two axes (e.g., a and b) of the ellipse to align with the I and Q axis of the IQ plane. In one embodiment, the length of the two axes are scaled by multiplying a scaling factor (e.g., scaling actor of 1), which is user-selected, with the standard deviation of the measurement results (including shot-to-shot measurements) of the qubit states discussed above. In one embodiment, such a standard deviation measures the dispersion of the measurement results of the qubit states discussed above relative to its mean and is calculated as the square root of the variance. In the embodiment in which the measurement results correspond to sets of two signals in quadrature, the standard deviation measures how far the signal fluctuates from the mean. In one embodiment, the standard deviation of the measurement results (including shot-to-shot measurements) of the qubit states is computed by discriminator engine 201 using various software tools, including, but not limited to, Signal Processing Toolbox™ of MathWorks®, Mathematica®, etc.

While the preceding discusses the present disclosure in connection with discriminator boundary 302 corresponding to an elliptical shape, discriminator boundary 302 may correspond to any arbitrary shape an experimenter desires to utilize. Furthermore, the principles of the present disclosure may utilize various standard discrimination techniques, such as Linear Discriminant Analysis, Quadratic Discriminant analysis, etc.

Furthermore, while the preceding discusses the present disclosure in connection with utilizing the IQ plane or two signals in quadrature, the principles of the present disclosure may be utilized in connection with classifying any data in a multi-dimensional space. A person of ordinary skill in the art would be capable of applying the principles of the present disclosure to such implementations. Furthermore, embodiments applying the principles of the present disclosure to such implementations would fall within the scope of the present disclosure.

In one embodiment, the location of discriminator boundary 302 (e.g., elliptical discriminator boundary) is established by utilizing models, such as Gaussian mixture models. A "Gaussian mixture model," as used herein, refers to a probabilistic model that assumes that all the data points (training data) are generated from a mixture of a finite number of Gaussian distributions with unknown parameters. In one embodiment, discriminator engine 201 uses an expectation-maximization algorithm to fit the Gaussian mixture model to the dataset (training data). The Gaussian mixture model learns the representation of the data distribution as a combination of unimodal distributions. The Gaussian mixture model assumes that the data in a specific cluster are generated by a specific Gaussian distribution/component. The Gaussian mixture model then fits K Gaussian components to the dataset by parameterizing the weight, mean and covariance of each cluster. If there are K clusters in the dataset, then the Gaussian mixture model fits the dataset by optimizing the sum of Gaussian distributions/components. The sum of the weights of all distributions equals to 1. After fitting the data (training data) with multiple Gaussian distributions, the results can be used to cluster any new data point into one of the identified clusters (corresponding to the discriminator boundary 302 which defines region of trust 301).

In one embodiment, the location of discriminator boundary 302 (e.g., elliptical discriminator boundary) may be calibrated to improve the accuracy of determining which measurement results (including shot-to-shot measurement results) of the qubit states are trustworthy or which measurement results (including shot-to-shot measurement results) of the qubit states are not trustworthy by rotating the axes (e.g., a and b) of the ellipse. In one embodiment, the location of discriminator boundary 302 (e.g., elliptical discriminator boundary) may be calibrated to improve the accuracy of determining which measurement results (including shot-to-shot measurement results) of the qubit states are trustworthy or which measurement results (including shot-to-shot measurement results) of the qubit states are not trustworthy by adjusting the scaling factor for each qubit state individually.

In one embodiment, the trust-based discriminator of the present disclosure may be further tuned by assigning mixed states to the shots for those measurement results that are outside regions of interest 301 as opposed to simply discarding such information.

Upon defining the regions of trust 301 using the created discriminator boundaries 302 as discussed above, evaluator engine 202 of classical computer 102 determines whether the measurement results, including shot-to-shot measurement results, are located within such regions of trust 301 to determine whether or not such measurement results are to be accepted or rejected.

In one embodiment, evaluator engine 202 receives a measurement result of a qubit state from the execution of a quantum circuit 109.

In one embodiment, measurement results (including shot-to-shot measurement results) of the qubit states (quantum state of 0 or 1) from the execution of quantum circuit 109 may correspond to sets of two signals in quadrature. In one embodiment, such measurement results are obtained by measuring the projection of the qubit state vector along a given axis. After a projective measurement is completed, the qubit will be in either one of its computational basis states.

In one embodiment, the measurement results of the qubits states may correspond to shot-shot-measurements of the qubit states. A "shot," as used herein, refers to a complete execution of quantum circuit 109. In one embodiment, such measurement results of the qubit states may be obtained during an execution of quantum circuit 109. Such measurements may be referred to herein as "mid-circuit measurements."

In one embodiment, various tools may be utilized by evaluator engine 202 to measure the results of the qubit states (quantum state of 0 or 1) from the execution of quantum circuit 109, such as IBM® Quantum.

In one embodiment, the performance of quantum circuit 109 is simulated via a simulator 203, such as the Qiskit® Aer simulator, IQS, stag, QuEST®, QX Simulator, QMDD, CHP, etc., in which the results of such a simulation provide the state of the qubit from the execution of quantum circuit 109.

As discussed above, in one embodiment, the measurement results of the qubits states correspond to sets of two signals in quadrature. A pair of signals is said to be in "quadrature" when they differ in phase by 90 degrees. In one embodiment, the measurement results discussed above correspond to the I (in-phase) and Q (quadrature) time integrated voltage signals.

In one embodiment, such a pair of signals is decomposed into a parameter space and the measurement results of the qubit states in the form of pairs of signals are measured repeatedly, as discussed above, to obtain the statistics (measurement results of the qubit states from the execution of quantum circuit 109).

As discussed above, evaluator engine 202 accepts the measurement results that fall within a region of trust 301 (e.g., region of trust 301A) and rejects those measurement results that fall outside the regions of trust 301. Evaluator engine 202 determines whether the measurement results are located within such regions of trust 301 based on the discriminator boundaries 302 using various software tools, including, but not limited to, IQ Signal Master, IQWizard, etc.

By utilizing such regions of trust 301, errors in the measurement results from a quantum system, such as measurement errors of the quantum states read from the execution of quantum circuits 109, are mitigated.

A further description of these and other functions is provided below in connection with the discussion of the method for mitigating measurement errors from a quantum system without requiring a large number of shots.

Prior to the discussion of the method for mitigating measurement errors from a quantum system without requiring a large number of shots, a description of the hardware configuration of classical computer 102 (FIG. 1) is provided below in connection with FIG. 4.

Figure 4:
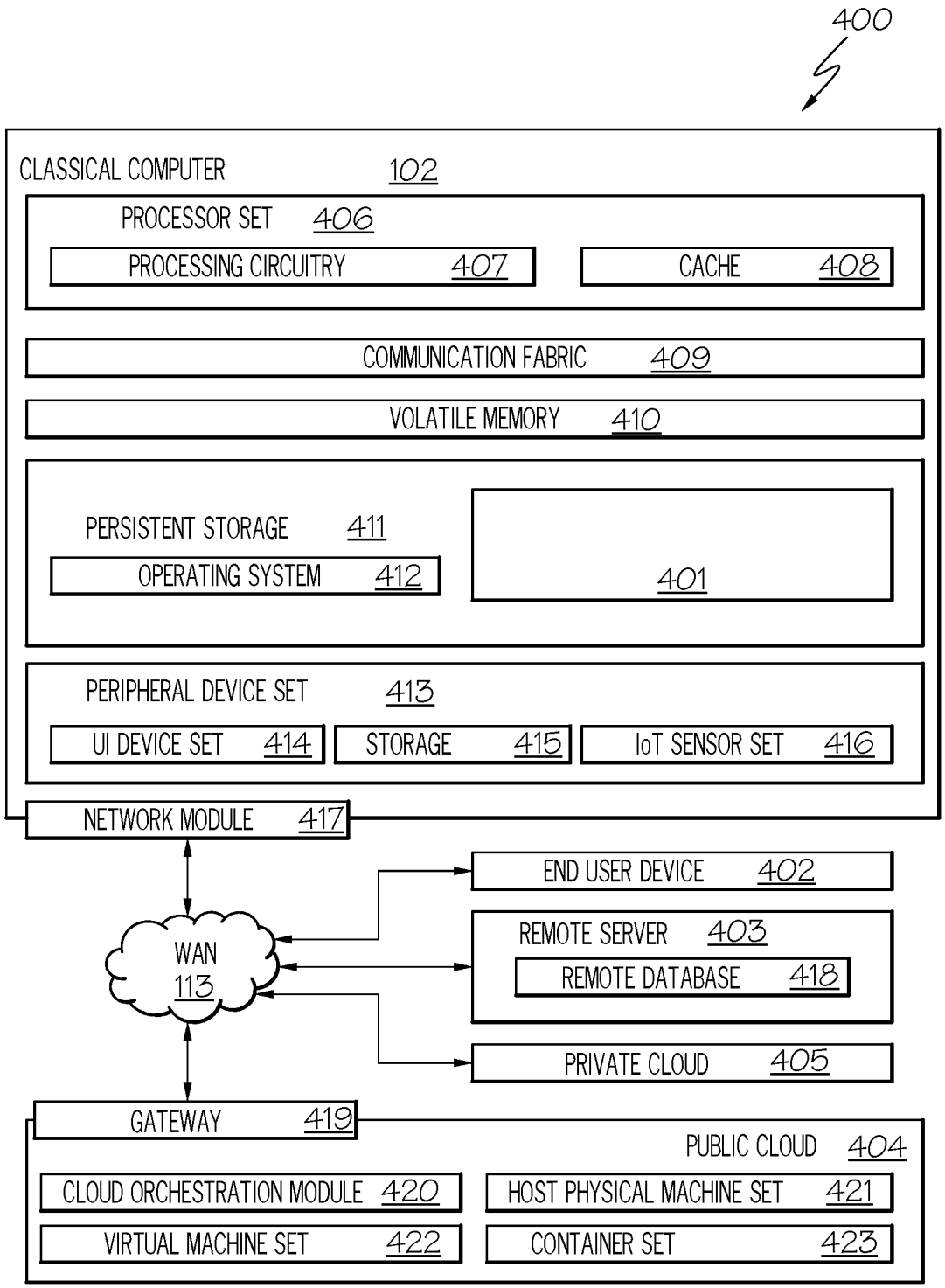
FIG. 4 illustrates an embodiment of the present disclosure of the hardware configuration of the classical computer which is representative of a hardware environment for practicing the present disclosure.

Referring now to FIG. 4, in conjunction with FIG. 1, FIG. 4 illustrates an embodiment of the present disclosure of the hardware configuration of classical computer 102 which is representative of a hardware environment for practicing the present disclosure.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 400 contains an example of an environment for the execution of at least some of the computer code involved in performing the inventive methods, such as mitigating measurement errors from a quantum system without requiring a large number of shots. In addition to block 401, computing environment 400 includes, for example, classical computer 102, network 113, such as a wide area network (WAN), end user device (EUD) 402, remote server 403, public cloud 404, and private cloud 405. In this embodiment, classical computer 102 includes processor set 406 (including processing circuitry 407 and cache 408), communication fabric 409, volatile memory 410, persistent storage 411 (including operating system 412 and block 401, as identified above), peripheral device set 413 (including user interface (UI) device set 414, storage 415, and Internet of Things (IoT) sensor set 416), and network module 417. Remote server 403 includes remote database 418. Public cloud 404 includes gateway 419, cloud orchestration module 420, host physical machine set 421, virtual machine set 422, and container set 423.

Classical computer 102 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 418. As is well understood in the art of computer technology, and depending upon the technology, performance of a computer-implemented method may be distributed among multiple computers and/or between multiple locations. On the other hand, in this presentation of computing environment 400, detailed discussion is focused on a single computer, specifically classical computer 102, to keep the presentation as simple as possible. Classical computer 102 may be located in a cloud, even though it is not shown in a cloud in FIG. 4. On the other hand, classical computer 102 is not required to be in a cloud except to any extent as may be affirmatively indicated.

Processor set 406 includes one, or more, computer processors of any type now known or to be developed in the future. Processing circuitry 407 may be distributed over multiple packages, for example, multiple, coordinated integrated circuit chips. Processing circuitry 407 may implement multiple processor threads and/or multiple processor cores. Cache 408 is memory that is located in the processor chip package(s) and is typically used for data or code that should be available for rapid access by the threads or cores running on processor set 406. Cache memories are typically organized into multiple levels depending upon relative proximity to the processing circuitry. Alternatively, some, or all, of the cache for the processor set may be located "off chip." In some computing environments, processor set 406 may be designed for working with qubits and performing quantum computing.

Computer readable program instructions are typically loaded onto classical computer 102 to cause a series of operational steps to be performed by processor set 406 of classical computer 102 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 408 and the other storage media discussed below. The program instructions, and associated data, are accessed by processor set 406 to control and direct performance of the inventive methods. In computing environment 400, at least some of the instructions for performing the inventive methods may be stored in block 401 in persistent storage 411.

Communication fabric 409 is the signal conduction paths that allow the various components of classical computer 102 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 410 is any type of volatile memory now known or to be developed in the future. Examples include dynamic type random access memory (RAM) or static type RAM. Typically, the volatile memory is characterized by random access, but this is not required unless affirmatively indicated. In classical computer 102, the volatile memory 410 is located in a single package and is internal to classical computer 102, but, alternatively or additionally, the volatile memory may be distributed over multiple packages and/or located externally with respect to classical computer 102.

Persistent Storage 411 is any form of non-volatile storage for computers that is now known or to be developed in the future. The non-volatility of this storage means that the stored data is maintained regardless of whether power is being supplied to classical computer 102 and/or directly to persistent storage 411. Persistent storage 411 may be a read only memory (ROM), but typically at least a portion of the persistent storage allows writing of data, deletion of data and re-writing of data. Some familiar forms of persistent storage include magnetic disks and solid state storage devices. Operating system 412 may take several forms, such as various known proprietary operating systems or open source Portable Operating System Interface type operating systems that employ a kernel. The code included in block 401 typically includes at least some of the computer code involved in performing the inventive methods.

Peripheral device set 413 includes the set of peripheral devices of classical computer 102. Data communication connections between the peripheral devices and the other components of classical computer 102 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 414 may include components such as a display screen, speaker, microphone, wearable devices (such as goggles and smart watches), keyboard, mouse, printer, touchpad, game controllers, and haptic devices. Storage 415 is external storage, such as an external hard drive, or insertable storage, such as an SD card. Storage 415 may be persistent and/or volatile. In some embodiments, storage 415 may take the form of a quantum computing storage device for storing data in the form of qubits. In embodiments where classical computer 102 is required to have a large amount of storage (for example, where classical computer 102 locally stores and manages a large database) then this storage may be provided by peripheral storage devices designed for storing very large amounts of data, such as a storage area network (SAN) that is shared by multiple, geographically distributed computers. IoT sensor set 416 is made up of sensors that can be used in Internet of Things applications. For example, one sensor may be a thermometer and another sensor may be a motion detector.

Network module 417 is the collection of computer software, hardware, and firmware that allows classical computer 102 to communicate with other computers through WAN 113. Network module 417 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 417 are performed on the same physical hardware device. In other embodiments (for example, embodiments that utilize software-defined networking (SDN)), the control functions and the forwarding functions of network module 417 are performed on physically separate devices, such that the control functions manage several different network hardware devices. Computer readable program instructions for performing the inventive methods can typically be downloaded to classical computer 102 from an external computer or external storage device through a network adapter card or network interface included in network module 417.

WAN 113 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 402 is any computer system that is used and controlled by an end user (for example, a customer of an enterprise that operates classical computer 102), and may take any of the forms discussed above in connection with classical computer 102. EUD 402 typically receives helpful and useful data from the operations of classical computer 102. For example, in a hypothetical case where classical computer 102 is designed to provide a recommendation to an end user, this recommendation would typically be communicated from network module 417 of classical computer 102 through WAN 113 to EUD 402. In this way, EUD 402 can display, or otherwise present, the recommendation to an end user. In some embodiments, EUD 402 may be a client device, such as thin client, heavy client, mainframe computer, desktop computer and so on.

Remote server 403 is any computer system that serves at least some data and/or functionality to classical computer 102. Remote server 403 may be controlled and used by the same entity that operates classical computer 102. Remote server 403 represents the machine(s) that collect and store helpful and useful data for use by other computers, such as classical computer 102. For example, in a hypothetical case where classical computer 102 is designed and programmed to provide a recommendation based on historical data, then this historical data may be provided to classical computer 102 from remote database 418 of remote server 403.

Public cloud 404 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 404 is performed by the computer hardware and/or software of cloud orchestration module 420. The computing resources provided by public cloud 404 are typically implemented by virtual computing environments that run on various computers making up the computers of host physical machine set 421, which is the universe of physical computers in and/or available to public cloud 404. The virtual computing environments (VCEs) typically take the form of virtual machines from virtual machine set 422 and/or containers from container set 423. It is understood that these VCEs may be stored as images and may be transferred among and between the various physical machine hosts, either as images or after instantiation of the VCE. Cloud orchestration module 420 manages the transfer and storage of images, deploys new instantiations of VCEs and manages active instantiations of VCE deployments. Gateway 419 is the collection of computer software, hardware, and firmware that allows public cloud 404 to communicate through WAN 113.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 405 is similar to public cloud 404, except that the computing resources are only available for use by a single enterprise. While private cloud 405 is depicted as being in communication with WAN 113 in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 404 and private cloud 405 are both part of a larger hybrid cloud.

Block 401 further includes the software components discussed above in connection with FIGS. 2-3 to mitigate measurement errors from a quantum system without requiring a large number of shots. In one embodiment, such components may be implemented in hardware. The functions discussed above performed by such components are not generic computer functions. As a result, classical computer 102 is a particular machine that is the result of implementing specific, non-generic computer functions.

In one embodiment, the functionality of such software components of classical computer 102, including the functionality for mitigating measurement errors from a quantum system without requiring a large number of shots, may be embodied in an application specific integrated circuit.

As stated above, there are several types of quantum computers (also known as quantum computing systems), including the quantum circuit model, quantum Turing machine, adiabatic quantum computer, one-way quantum computer, and various quantum cellular automata. The most widely used model is the quantum circuit, based on the quantum bit, or "qubit," which is somewhat analogous to the bit in classical computation. A qubit can be in a 1 or 0 quantum state, or in a superposition of the 1 and 0 states. When the state of the qubit is measured from the execution of the quantum circuit, however, it is always 0 or 1 where the probability of either outcome depends on the qubit's quantum state immediately prior to measurement. That is, the qubit state collapses into either the quantum state of 0 (represented as "|0>") or the quantum state of 1 (represented as "|1>"). Unfortunately, quantum devices, such as quantum circuits, are susceptible to errors. In particular, the qubit measurement is among the most error-prone operations on quantum devices, with error rates ranging from 8% to 30% for current hardware. These errors arise from bit flips, i.e., from erroneously recording an outcome as 0 given it was actually 1, and vice-versa. As a result, the classification of the measurement of the qubit as being in a particular quantum state is susceptible to errors. If such quantum state measurements are well calibrated, such qubit states may form two clouds (one for the quantum state of 0 and one for the quantum state of 1) such as in an IQ (in-phase and quadrature) plane. Unfortunately, such clouds may not be well separated due to the errors in the quantum state measurements discussed above and have a substantial overlap thereby increasing the chance of false classification (i.e., falsely classifying the measurement as being in the qubit state of 0 as opposed to the qubit state of 1 or vice-versa). Furthermore, even if the clouds are well separated, a" T1" event (decay of an excited state) during the measurement process may cause the measurement to be in a position in the IQ plane between the two clouds making it difficult to classify the qubit state. Various error mitigation strategies have been developed in an attempt to mitigate such measurement errors. Unfortunately, such error mitigation strategies require a large number of shots (a shot corresponds to one complete execution of a quantum circuit) to build a quasi-probability distribution (probabilities of the occurrence of the measured quantum state being in the quantum state of 0 or 1) utilized by such error mitigation strategies. Furthermore, such mitigation strategies are not able to mitigate errors in quantum state measurements on a shot-by-shot basis, which would improve the speed at which measurement errors in quantum state measurements are mitigated. As a result, there is not currently a means for effectively mitigating errors in measurements from a quantum system, such as measurements of the quantum states read from the execution of a quantum circuit, including on a shot-by-shot basis, without requiring a large number of shots.

Figure 5:
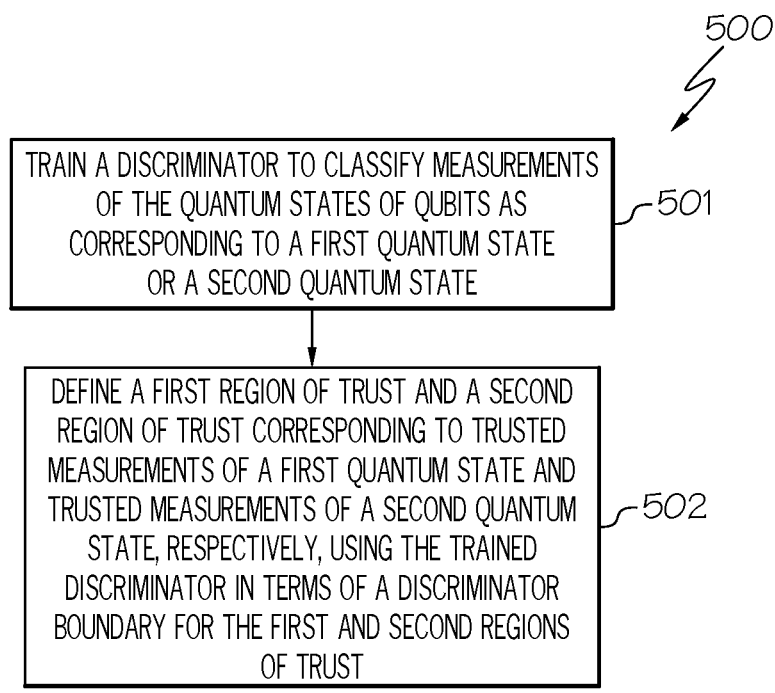
FIG. 5 is a flowchart of a method for defining regions of trust by creating a discriminator boundary for the regions of trust in accordance with an embodiment of the present disclosure.
Figure 6:
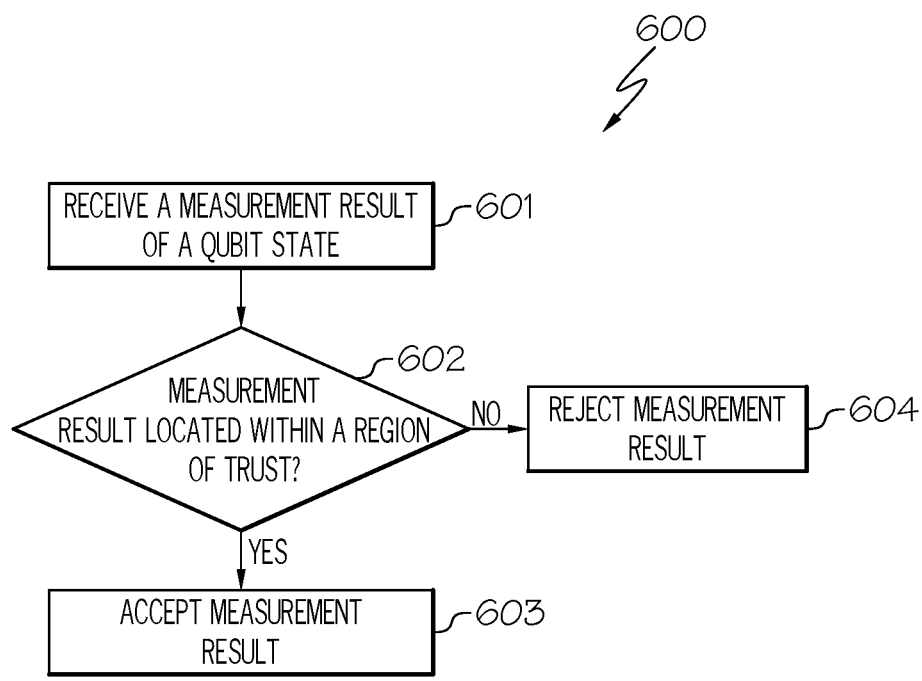
FIG. 6 is a flowchart of a method for mitigating errors in measurements from a quantum system without requiring a large number of shots in accordance with an embodiment of the present disclosure.

The embodiments of the present disclosure provide the means for effectively mitigating errors in measurements from a quantum system, such as measurements of the quantum states read from the execution of a quantum circuit, without requiring a large number of shots by defining regions of trust corresponding to trusted measurements of a first quantum state (e.g., quantum state of 0) and a second quantum state (e.g., quantum state of 1) of a qubit by creating a discriminator boundary for the regions of trust as discussed below in connection with FIGS. 5-6. FIG. 5 is a flowchart of a method for defining regions of trust by creating a discriminator boundary for the regions of trust. FIG. 6 is a flowchart of a method for mitigating errors in measurements from a quantum system without requiring a large number of shots.

As stated above, FIG. 5 is a flowchart of a method 500 for defining regions of trust by creating a discriminator boundary for the regions of trust in accordance with an embodiment of the present disclosure.

While the following discusses FIG. 5 in connection with classifying between the 0 and 1 quantum states, the principles of the present disclosures may be utilized for classifying any number of states. For example, the principles of the present disclosure may be utilized in applications for discriminating complex quantum systems with a significant population that is not in the 0 and 1 quantum states. A person of ordinary skill in the art would be capable of applying the principles of the present disclosure to such implementations. Furthermore, embodiments applying the principles of the present disclosure to such implementations would fall within the scope of the present disclosure.

Referring now to FIG. 5, in conjunction with FIGS. 1-4, in step 501, discriminator engine 201 of classical computer 102 trains a discriminator to classify measurements of the quantum states of qubits as corresponding to a first quantum state (e.g., quantum state of 0) or a second quantum state (e.g., quantum state of 1).

As discussed above, discriminator engine 201 trains a discriminator to classify the measurements (measurement results of the qubit states) as corresponding to a first quantum state (e.g., quantum state of 0) or a second quantum state (e.g., quantum state of 1) based on sample data consisting of measurement results of known quantum states (e.g., quantum state of 0, quantum state of 1). Such sample data is referred to herein as the "training data," which is used by a machine learning algorithm to make decisions as to the classification of the measurement result of the qubit state as corresponding to a particular quantum state. For example, a discriminator may be trained to classify measurement results from the execution of quantum circuit 109 as corresponding to a first quantum state (e.g., quantum state of 0) based on training data that includes measurement results of the known quantum state of 0. Similarly, the discriminator may be trained to classify measurement results from the execution of quantum circuit 109 as corresponding to a second quantum state (e.g., quantum state of 1) based on training data that includes measurement results of the known quantum state of 1. The algorithm iteratively makes predictions on the training data as to the predicted quantum state of the measurement results until the predictions achieve the desired accuracy as determined by an expert. Examples of such learning algorithms include nearest neighbor, Naïve Bayes, decision trees, linear regression, support vector machines and neural networks.

In one embodiment, the discriminator is trained/calibrated by measuring the result of the execution of a quantum circuit 109 of a known quantum state (e.g., quantum state of 0, quantum state of 1) and labeling such measurements as corresponding to measurements of a first quantum state (e.g., quantum state of 0) and measurements of a second quantum state (e.g., quantum state of 1). Such labeled measurements may then be used as "training data" to train the discriminator as discussed above.

In one embodiment, discriminator engine 201 of classical computer 102 trains a discriminator to classify multi-dimensional quantum data on a shot-by-shot basis.

In step 502, discriminator engine 201 of classical computer 102 defines a first region of trust 301A and a second region of trust 301B corresponding to trusted measurements of a first quantum state (e.g., quantum state of 0) and trusted measurements of a second quantum state (e.g., quantum state of 1), respectively, using the trained discriminator in terms of a discriminator boundary 302A, 302B for the first and second regions of trust 301A, 301B, respectively.

As discussed above, in one embodiment, discriminator engine 201 uses the trained discriminator to distinguish between measurement results of qubit states that are read from the execution of quantum circuits 109 that fall within region of trust 301 or outside regions of trust 301. In one embodiment, such regions of trust, such as a first region of trust (e.g., region of trust 301A) and a second region of trust (region of trust 301B), where the first region of trust corresponds to trusted measurements of a first state of a qubit (e.g., quantum state of 0) and the second region of trust corresponds to trusted measurements of a second state of a qubit (e.g., quantum state of 1), are defined by the trained discriminator. For example, the first region of trust (e.g., region of trust 301A) may be defined by the discriminator in terms of discriminator boundary 302 (e.g., discriminator boundary 302A) which determines whether measurement results of the quantum state of a qubit read from the execution of quantum circuit 109 falls within the first region of trust corresponding to trusted measurements of the first quantum state (e.g., quantum state of 0). The second region of trust (e.g., region of trust 301B) may be defined by the discriminator in terms of discriminator boundary 302 (e.g., discriminator boundary 302B) which determines whether measurement results of the quantum state of a qubit read from the execution of quantum circuits 109 falls within the second region of trust corresponding to trusted measurements of the second quantum state (e.g., quantum state of 1). Hence, such regions of trust 301 are defined by a discriminator boundary 302 which determines whether measurement results of the quantum state of a qubit read from the execution of quantum circuits 109 falls within or outside such regions of trust 301. Those measurement results that fall within region of trust 301 are accepted; whereas, those measurements that fall outside regions of trust 301 (outside the discriminator boundary) are rejected.

As discussed above, those measurement results that fall within region of trust 301 (e.g., region of trust 301A) are accepted; whereas, those measurement results that fall outside regions of trust 301 (outside discriminator boundary 302) are rejected. An illustration of such regions of trust 301 defined by discriminator boundary 302 is shown in FIG. 3.

As shown in FIG. 3, regions of trust 301A, 301B are defined by a discriminator boundary 302A, 302B, respectively, which determines which measurement results (represented by dots 303) of the quantum states of the qubits read from the execution of quantum circuits 109 falls within or outside such regions of trust. In one embodiment, region of trust 301A represents those measurements (represented by dots 303) of a first quantum state (e.g., quantum state of 0) that are deemed to be trustworthy and region of trust 301B represents those measurements (represented by dots 303) of a second quantum state (e.g., quantum state of 1) that are deemed to be trustworthy. Measurements (represented by dots 303) outside such regions of trust 301A, 301B, as determined by discriminator boundary 302A, 302B, respectively, are deemed to not be trustworthy.

In one embodiment, discriminator boundary 302 of such regions of trust 301, which determines which measurement results are within or outside region of trust 301 (i.e., determines which measurement results are trustworthy or not trustworthy), is determined based on the trained discriminator discussed above.

In one embodiment, discriminator boundary 302 corresponds to an elliptical discriminator boundary. In one embodiment, regions of trust 301 are defined in an IQ (in-phase and quadrature) plane. In such an embodiment, the location of discriminatory boundary 302 is established by selecting the two axes (e.g., a and b) of the ellipse to align with the I and Q axis of the IQ plane. In one embodiment, the length of the two axes are scaled by multiplying a scaling factor (e.g., scaling actor of 1), which is user-selected, with the standard deviation of the measurement results (including shot-to-shot measurements) of the qubit states discussed above. In one embodiment, such a standard deviation measures the dispersion of the measurement results of the qubit states discussed above relative to its mean and is calculated as the square root of the variance. In the embodiment in which the measurement results correspond to sets of two signals in quadrature, the standard deviation measures how far the signal fluctuates from the mean. In one embodiment, the standard deviation of the measurement results (including shot-to-shot measurements) of the qubit states is computed by discriminator engine 201 using various software tools, including, but not limited to, Signal Processing Toolbox™ of MathWorks®, Mathematica®, etc.

While the preceding discusses the present disclosure in connection with discriminator boundary 302 corresponding to an elliptical shape, discriminator boundary 302 may correspond to any arbitrary shape an experimenter desires to utilize. Furthermore, the principles of the present disclosure may utilize various standard discrimination techniques, such as Linear Discriminant Analysis, Quadratic Discriminant analysis, etc.

Furthermore, while the preceding discusses the present disclosure in connection with utilizing the IQ plane or two signals in quadrature, the principles of the present disclosure may be utilized in connection with classifying any data in a multi-dimensional space. A person of ordinary skill in the art would be capable of applying the principles of the present disclosure to such implementations. Furthermore, embodiments applying the principles of the present disclosure to such implementations would fall within the scope of the present disclosure.

In one embodiment, the location of discriminator boundary 302 (e.g., elliptical discriminator boundary) is established by utilizing models, such as Gaussian mixture models. A "Gaussian mixture model," as used herein, refers to a probabilistic model that assumes that all the data points (training data) are generated from a mixture of a finite number of Gaussian distributions with unknown parameters. In one embodiment, discriminator engine 201 uses an expectation-maximization algorithm to fit the Gaussian mixture model to the dataset (training data). The Gaussian mixture model learns the representation of the data distribution as a combination of unimodal distributions. The Gaussian mixture model assumes that the data in a specific cluster are generated by a specific Gaussian distribution/component. The Gaussian mixture model then fits K Gaussian components to the dataset by parameterizing the weight, mean and covariance of each cluster. If there are K clusters in the dataset, then the Gaussian mixture model fits the dataset by optimizing the sum of Gaussian distributions/components. The sum of the weights of all distributions equals to 1. After fitting the data (training data) with multiple Gaussian distributions, the results can be used to cluster any new data point into one of the identified clusters (corresponding to the discriminator boundary 302 which defines region of trust 301).

In one embodiment, the location of discriminator boundary 302 (e.g., elliptical discriminator boundary) may be calibrated to improve the accuracy of determining which measurement results (including shot-to-shot measurement results) of the qubit states are trustworthy or which measurement results (including shot-to-shot measurement results) of the qubit states are not trustworthy by rotating the axes (e.g., a and b) of the ellipse. In one embodiment, the location of discriminator boundary 302 (e.g., elliptical discriminator boundary) may be calibrated to improve the accuracy of determining which measurement results (including shot-to-shot measurement results) of the qubit states are trustworthy or which measurement results (including shot-to-shot measurement results) of the qubit states are not trustworthy by adjusting the scaling factor for each qubit state individually.

In one embodiment, the trust-based discriminator of the present disclosure may be further tuned by assigning mixed states to the shots for those measurement results that are outside regions of interest 301 as opposed to simply discarding such information.

Upon defining the regions of trust 301 using the created discriminator boundaries 302 as discussed above, evaluator engine 202 determines whether the measurement results, including shot-to-shot measurement results, are located within such regions of trust 301 to determine whether or not such measurement results are to be accepted or rejected as discussed below in connection with FIG. 6.

FIG. 6 is a flowchart of a method 600 for mitigating errors in measurements from a quantum system without requiring a large number of shots in accordance with an embodiment of the present disclosure.

Referring to FIG. 6, in conjunction with FIGS. 1-5, in step 601, evaluator engine 202 of classical computer 102 receives a measurement result of a qubit state from the execution of quantum circuit 109.

As discussed above, measurement results (including shot-to-shot measurement results) of the qubit states (quantum state of 0 or 1) from the execution of quantum circuit 109 may correspond to a set of two signals in quadrature. In one embodiment, such measurement results are obtained by measuring the projection of the qubit state vector along a given axis. After a projective measurement is completed, the qubit will be in either one of its computational basis states.

In one embodiment, the measurement results of the qubits states may correspond to shot-shot-measurements of the qubit states. A "shot," as used herein, refers to a complete execution of quantum circuit 109. In one embodiment, such measurement results of the qubit states may be obtained during an execution of quantum circuit 109. Such measurements may be referred to herein as "mid-circuit measurements."

In one embodiment, various tools may be utilized by evaluator engine 202 to measure the results of the qubit states (quantum state of 0 or 1) from the execution of quantum circuit 109, such as IBM® Quantum.

In one embodiment, the performance of quantum circuit 109 is simulated via a simulator 203, such as the Qiskit® Aer simulator, IQS, stag, QuEST®, QX Simulator, QMDD, CHP, etc., in which the results of such a simulation provide the state of the qubit from the execution of quantum circuit 109.

As discussed above, in one embodiment, the measurement results of the qubits states correspond to sets of two signals in quadrature. A pair of signals is said to be in "quadrature" when they differ in phase by 90 degrees. In one embodiment, the measurement results discussed above correspond to the I (in-phase) and Q (quadrature) time integrated voltage signals.

In one embodiment, such a pair of signals is decomposed into a parameter space and the measurement results of the qubit states in the form of pairs of signals are measured repeatedly, as discussed above, to obtain the statistics (measurement results of the qubit states from the execution of quantum circuit 109).

As discussed above, evaluator engine 202 accepts the measurement results that fall within a region of trust 301 (e.g., region of trust 301A) and rejects those measurement results that fall outside the regions of trust 301. Evaluator engine 202 determines whether the measurement results are located within such regions of trust 301 based on the discriminator boundaries 302 using various software tools, including, but not limited to, IQ Signal Master, IQWizard, etc.

By utilizing such regions of trust 301, errors in the measurement results from a quantum system, such as measurement errors of the quantum states read from the execution of quantum circuits 109, are mitigated without requiring a large number of shots.

In step 602, evaluator engine 202 of classical computer 102 determines whether the measurement result (received in step 601) is located within region of trust 301. If the measurement result is located within region of trust 301, then, in step 603, evaluator engine 202 of classical computer 102 accepts the measurement result. For example, as shown in FIG. 3, if the measurement result represented by dot 303 is located within region of trust 301 as defined by discriminator boundary 302, then such a measurement result is accepted by evaluator engine 202.

Alternatively, if the measurement result is not located within region of trust 301, then, in step 604, evaluator engine 202 of classical computer 102 rejects the measurement result since such a measurement result is not likely to be trusted. For example, as shown in FIG. 3, if the measurement result represented by dot 303 is located outside regions of trust 301 as defined by discriminator boundaries 302, then such a measurement result is rejected by evaluator engine 202.

By utilizing such regions of trust 301, measurement results that are likely to be in error (i.e., measurement results that are untrustworthy) can be identified based on such measurement results corresponding to data points located outside the discriminator boundary 302 of such regions of trust 301. Based on identifying such untrustworthy measurement results, such measurement results can be rejected thereby mitigating errors in the measurements from a quantum system without requiring a large number of shots.

As a result of the foregoing, the principles of the present disclosure provide a means for effectively mitigating errors in measurements from a quantum system, such as measurements of the quantum states read from the execution of a quantum circuit, without requiring a large number of shots by defining regions of trust corresponding to trusted measurements of a first quantum state (e.g., quantum state of 0) and a second quantum state (e.g., quantum state of 1) of a qubit by creating a discriminator boundary for the regions of trust. After defining such regions of trust, when a measurement result of a qubit state is received, if such a measurement result is not within one of these regions of trust, the measurement result is deemed to be untrustworthy and is rejected. In this manner, errors in the measurements from a quantum system are mitigated without requiring a large number of shots.

Furthermore, the principles of the present disclosure improve the technology or technical field involving measurement error mitigation in quantum computing.

As discussed above, there are several types of quantum computers (also known as quantum computing systems), including the quantum circuit model, quantum Turing machine, adiabatic quantum computer, one-way quantum computer, and various quantum cellular automata. The most widely used model is the quantum circuit, based on the quantum bit, or "qubit," which is somewhat analogous to the bit in classical computation. A qubit can be in a 1 or 0 quantum state, or in a superposition of the 1 and 0 states. When the state of the qubit is measured from the execution of the quantum circuit, however, it is always 0 or 1 where the probability of either outcome depends on the qubit's quantum state immediately prior to measurement. That is, the qubit state collapses into either the quantum state of 0 (represented as "|0>") or the quantum state of 1 (represented as "|1>"). Unfortunately, quantum devices, such as quantum circuits, are susceptible to errors. In particular, the qubit measurement is among the most error-prone operations on quantum devices, with error rates ranging from 8% to 30% for current hardware. These errors arise from bit flips, i.e., from erroneously recording an outcome as 0 given it was actually 1, and vice-versa. As a result, the classification of the measurement of the qubit as being in a particular quantum state is susceptible to errors. If such quantum state measurements are well calibrated, such qubit states may form two clouds (one for the quantum state of 0 and one for the quantum state of 1) such as in an IQ (in-phase and quadrature) plane. Unfortunately, such clouds may not be well separated due to the errors in the quantum state measurements discussed above and have a substantial overlap thereby increasing the chance of false classification (i.e., falsely classifying the measurement as being in the qubit state of 0 as opposed to the qubit state of 1 or vice-versa). Furthermore, even if the clouds are well separated, a" T1" event (decay of an excited state) during the measurement process may cause the measurement to be in a position in the IQ plane between the two clouds making it difficult to classify the qubit state. Various error mitigation strategies have been developed in an attempt to mitigate such measurement errors. Unfortunately, such error mitigation strategies require a large number of shots (a shot corresponds to one complete execution of a quantum circuit) to build a quasi-probability distribution (probabilities of the occurrence of the measured quantum state being in the quantum state of 0 or 1) utilized by such error mitigation strategies. Furthermore, such mitigation strategies are not able to mitigate errors in quantum state measurements on a shot-by-shot basis, which would improve the speed at which measurement errors in quantum state measurements are mitigated. As a result, there is not currently a means for effectively mitigating errors in measurements from a quantum system, such as measurements of the quantum states read from the execution of a quantum circuit, including on a shot-by-shot basis, without requiring a large number of shots.

Embodiments of the present disclosure improve such technology by training a discriminator to classify the measurement results of the quantum states of qubits as corresponding to a first quantum state (e.g., quantum state of 0) or a second quantum state (e.g., quantum state of 1). A first region of trust (corresponding to trusted measurements of a first quantum state) with a first discriminator boundary and a second region of trust (corresponding to trusted measurements of a second quantum state) with a second discriminator boundary are defined using the trained discriminator. The first and second discriminator boundaries for the first and second regions of trust are used to classify measurement results as being within and outside such regions of trust. By utilizing such a scheme, measurement results of the qubit states that correspond to a shot-to-shot measurement of the qubit state may be received and analyzed. If the shot-to-shot measurement result of a qubit result falls within such a region of trust, the measurement result is accepted. If, however, the shot-to-shot measurement result of a qubit state falls outside such regions of trust, the measurement result is rejected. In this manner, measurement errors from a quantum system are effectively mitigated, including measurement errors involving shot-to-shot measurement results of the quantum states read from the execution of the quantum circuits, without requiring a large number of shots. Furthermore, in this manner, there is an improvement in the technical field involving measurement error mitigation in quantum computing.

The technical solution provided by the present disclosure cannot be performed in the human mind or by a human using a pen and paper. That is, the technical solution provided by the present disclosure could not be accomplished in the human mind or by a human using a pen and paper in any reasonable amount of time and with any reasonable expectation of accuracy without the use of a computer.

In one embodiment of the present disclosure, a method for mitigating errors in measurements from a quantum system comprises training a discriminator to classify measurements of quantum states of qubits as corresponding to a first quantum state or a second quantum state. The method further comprises defining a first region of trust based on a first discriminator boundary and a second region of trust based on a second discriminator boundary corresponding to trusted measurements of the first quantum state and the second quantum state, respectively, using the trained discriminator. The method additionally comprises receiving a measurement result of a qubit state. Furthermore, the method comprises rejecting the measurement result in response to not being located within the first region of trust or the second region of trust.

Additionally, in one embodiment of the present disclosure, the measurement result of the qubit state corresponds to a set of two signals in quadrature.

Furthermore, in one embodiment of the present disclosure, the first and second regions of trust are defined in an IQ plane.

Additionally, in one embodiment of the present disclosure, the method further comprises selecting a first axis and a second axis of an ellipse to align with an in-phase and a quadrature axis, respectively, to create the first discriminator boundary and the second discriminator boundary.

Furthermore, in one embodiment of the present disclosure, the method additionally comprises scaling a length of the first and second axes by multiplying a scaling factor with a standard deviation.

Additionally, in one embodiment of the present disclosure, the measurement result of the qubit state corresponds to a shot-to-shot measurement of the qubit state.

Furthermore, in one embodiment of the present disclosure, the measurement result of the qubit state corresponds to a measurement during an execution of a quantum circuit.

Additionally, in one embodiment of the present disclosure, the discriminator is trained to classify multi-dimensional quantum data on a shot-by-shot basis.

Other forms of the embodiments of the method described above are in a system and in a computer program product.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for mitigating errors in measurements from a quantum system, the method comprising:
   training a discriminator to classify measurements of quantum states of qubits as corresponding to a first quantum state or a second quantum state;
   defining a first region of trust based on a first discriminator boundary and a second region of trust based on a second discriminator boundary corresponding to trusted measurements of said first quantum state and said second quantum state, respectively, using said trained discriminator;
   receiving a measurement result of a qubit state; and
   rejecting said measurement result in response to not being located within said first region of trust or said second region of trust.

2. The method as recited in claim 1, wherein said measurement result of said qubit state corresponds to a set of two signals in quadrature.

3. The method as recited in claim 1, wherein said first and second regions of trust are defined in an IQ plane.

4. The method as recited in claim 3 further comprising:
   selecting a first axis and a second axis of an ellipse to align with an in-phase and a quadrature axis, respectively, to create said first discriminator boundary and said second discriminator boundary.

5. The method as recited in claim 4 further comprising:
   scaling a length of said first and second axes by multiplying a scaling factor with a standard deviation.

6. The method as recited in claim 1, wherein said measurement result of said qubit state corresponds to a shot-to-shot measurement of said qubit state.

7. The method as recited in claim 1, wherein said measurement result of said qubit state corresponds to a measurement during an execution of a quantum circuit.

8. The method as recited in claim 1, wherein said discriminator is trained to classify multi-dimensional quantum data on a shot-by-shot basis.

9. A computer program product for mitigating errors in measurements from a quantum system, the computer program product comprising one or more computer readable storage mediums having program code embodied therewith, the program code comprising programming instructions for:
   training a discriminator to classify measurements of quantum states of qubits as corresponding to a first quantum state or a second quantum state;
   defining a first region of trust based on a first discriminator boundary and a second region of trust based on a second discriminator boundary corresponding to trusted measurements of said first quantum state and said second quantum state, respectively, using said trained discriminator;
   receiving a measurement result of a qubit state; and
   rejecting said measurement result in response to not being located within said first region of trust or said second region of trust.

10. The computer program product as recited in claim 9, wherein said measurement result of said qubit state corresponds to a set of two signals in quadrature.

11. The computer program product as recited in claim 9, wherein said first and second regions of trust are defined in an IQ plane.

12. The computer program product as recited in claim 11, wherein the program code further comprises the programming instructions for:
   selecting a first axis and a second axis of an ellipse to align with an in-phase and a quadrature axis, respectively, to create said first discriminator boundary and said second discriminator boundary.

13. The computer program product as recited in claim 12, wherein the program code further comprises the programming instructions for:
   scaling a length of said first and second axes by multiplying a scaling factor with a standard deviation.

14. The computer program product as recited in claim 9, wherein said measurement result of said qubit state corresponds to a shot-to-shot measurement of said qubit state.

15. The computer program product as recited in claim 9, wherein said measurement result of said qubit state corresponds to a measurement during an execution of a quantum circuit.

16. The computer program product as recited in claim 9, wherein said discriminator is trained to classify multi-dimensional quantum data on a shot-by-shot basis.

17. A system, comprising:
   a memory for storing a computer program for mitigating errors in measurements from a quantum system; and
   a processor connected to said memory, wherein said processor is configured to execute program instructions of the computer program comprising:
      training a discriminator to classify measurements of quantum states of qubits as corresponding to a first quantum state or a second quantum state;
      defining a first region of trust based on a first discriminator boundary and a second region of trust based on a second discriminator boundary corresponding to trusted measurements of said first quantum state and said second quantum state, respectively, using said trained discriminator;
      receiving a measurement result of a qubit state; and
      rejecting said measurement result in response to not being located within said first region of trust or said second region of trust.

18. The system as recited in claim 17, wherein said measurement result of said qubit state corresponds to a set of two signals in quadrature.

19. The system as recited in claim 17, wherein said first and second regions of trust are defined in an IQ plane.

20. The system as recited in claim 18, wherein the program instructions of the computer program further comprise:

selecting a first axis and a second axis of an ellipse to align with an in-phase and a quadrature axis, respectively, to create said first discriminator boundary and said second discriminator boundary.

* * * * *